US009454461B1

(12) United States Patent
Bates et al.

(10) Patent No.: US 9,454,461 B1
(45) Date of Patent: Sep. 27, 2016

(54) CALL STACK DISPLAY WITH PROGRAM FLOW INDICATION

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/687,305

(22) Filed: Apr. 15, 2015

(51) Int. Cl.
*G06F 9/44* (2006.01)
*G06F 11/36* (2006.01)
(52) U.S. Cl.
CPC ............. *G06F 11/3636* (2013.01); *G06F 8/70* (2013.01)
(58) Field of Classification Search
None
See application file for complete search history.

(56) References Cited

U.S. PATENT DOCUMENTS

| 7,577,942 | B2 | 8/2009 | Bates et al. | |
|---|---|---|---|---|
| 8,135,572 | B2 * | 3/2012 | Crawford | G06F 11/3664 717/135 |
| 8,250,537 | B2 | 8/2012 | Pangburn | |
| 8,327,332 | B2 | 12/2012 | Sutanto et al. | |
| 8,595,702 | B2 | 11/2013 | Maybee et al. | |
| 8,661,413 | B2 | 2/2014 | Bates | |
| 2012/0159449 | A1 | 6/2012 | Arnold et al. | |
| 2014/0258985 | A1 | 9/2014 | Yawn et al. | |

OTHER PUBLICATIONS

Bates et al., "Call Stack Display with Program Flow Indication", U.S. Appl. No. 14/735,261, filed Jun. 10, 2015.
List of IBM Patents or Patent Applications Treated as Related.
Aniszczyk et al., "Debugging with the Eclipse Platform," http://www.ibm.com/developerworks/library/os-ecbug/, 8 pages (last modified May 1, 2007; last accessed Jan. 28, 2015 2:21 PM).
Hedin et al., "The Winer Environment: Direct Interaction with Abstractions," In ECOOP'88 European Conference on Object-Oriented Programming, pp. 41-54, Springer Berlin Heidelberg, 1988.
Jana, "Mastering Debugging in Visual Studio 2010—A Beginner's Guide," http://www.codeproject.com/Articles/79508/Mastering-Debugging-in-Vi . . . , 29 pages (last modified May 6, 2010; last accessed Jan. 28, 2015 2:24 PM).

(Continued)

*Primary Examiner* — Qamrun Nahar
(74) *Attorney, Agent, or Firm* — Mark G. Edwards; Feb R. Cabrasawan (57) ABSTRACT

A computer implemented method for identifying program flow in a computer program, executing in a debugger on at least one processor, subsequent to suspending execution of the computer program at a user breakpoint can include suspending execution of the computer program at a first user breakpoint, setting, by the debugger, one or more tracking breakpoints in one or more routines that can continue execution from the first user breakpoint, then resuming execution of the computer program. The method may be continued by suspending execution of the computer program at a second user breakpoint after processing by the at least one processor at least one instruction of the computer program. The method may further include determining whether to provide an indicator to indicate that at least one of the one or more tracking breakpoints was hit during the executing, and providing the indicator in response to determining to provide the indicator.

13 Claims, 5 Drawing Sheets

(56) References Cited

OTHER PUBLICATIONS

Microsoft, "Map methods on the call stack while debugging in Visual Studio," Visual Studio 2013, http://msdn.microsoft.com/en-us/library/dn194476.aspx, 7 pages (last accessed Jan. 28, 2015 2:25 PM).

Microsoft, "Record Code Execution with IntelliTrace for Debugging in Visual Studio," Visual Studio 2013, https://msdn.microsoft.com/en-us/-/library/dd572114.aspx#GoingFurther, 8 pages, © 2015 Microsoft (last accessed Jan. 28, 2015 2:26 PM).

Mozilla, "Firefox Developer Tools," https://developer.mozilla.org/en-US/docs/Tools/Debuger, 2 pages (last accessed Jan. 28, 2015 2:23 PM).

* cited by examiner

CALL STACK DISPLAY WITH PROGRAM FLOW INDICATION

BACKGROUND

The present disclosure relates to computer software, and more specifically, to a software debugger application that can identify program flow in a computer program, executing in a debugger, subsequent to resuming execution from a user breakpoint.

Debuggers are computer applications that can enable a user (e.g., a developer) to analyze and troubleshoot an executing computer program. Debuggers may have access to the computer program's source code and machine executable code, and may be able to execute, suspend and resume execution the computer program on its own, or at a user's request. A debugger executing a computer program can receive requests (e.g., from a user or developer) to set user breakpoints at certain source or machine code instructions in the computer program. The breakpoints can suspend (or interrupt) the execution of the computer program, allowing the user to analyze the computer program while it's executing. The debugger may add breakpoints to a computer program on the user's behalf by inserting one or more instructions into the computer program's source or machine executable code.

SUMMARY

According to embodiments of the present disclosure, a computer implemented method for identifying program flow in a computer program, executing in a debugger on at least one processor, subsequent to suspending execution of the computer program at a user breakpoint can include suspending execution of the computer program at a first user breakpoint, setting, by the debugger, one or more tracking breakpoints in one or more routines that can continue execution from the first user breakpoint, then resuming execution of the computer program. The method may be continued by suspending execution of the computer program at a second user breakpoint after processing by the at least one processor at least one instruction of the computer program. The method may further include determining whether to provide an indicator to indicate that at least one of the one or more tracking breakpoints was hit during the executing, and providing the indicator in response to determining to provide the indicator.

Various embodiments are directed towards a computer system for identifying program flow in a computer program, executing in a debugger on at least one processor, subsequent to suspending execution of the computer program at a user breakpoint. The computer system may include a memory configured to store the computer program, a first execution suspension module configured to suspend execution of the computer program at a first user breakpoint, a breakpoint setting module configured to set one or more tracking breakpoints in one or more routines that can continue execution from the first user breakpoint, and a processor configured to execute the computer program. The computer system may further include a second execution suspension module configured to suspend execution of the computer program at a second user breakpoint after processing by the at least one processor at least one instruction of the computer program, a breakpoint determining module configured to determine whether to provide an indicator to indicate that at least one of the one or more tracking breakpoints was hit during the executing, and an indicator providing module configured to provide the indicator in response to determining to provide the indicator.

Particular embodiments are directed toward a computer program product for identifying program flow in a computer program, executing in a debugger on at least one processor, subsequent to suspending execution of the computer program at a user breakpoint.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer software, more particular aspects relate to software debugger application that can identify program flow in a computer program, executing in a debugger, subsequent to resuming execution from a user breakpoint. While the present disclosure is not necessarily limited to such applications, various aspects of the disclosure may be appreciated through a discussion of various examples using this context.

Embodiments of this disclosure are based on the recognition that a user moving from one breakpoint to another may have difficulty tracking program flow (e.g., which routines or code segments are executed) between the breakpoints. One example scenario occurs when a user encounters (or hits) a breakpoint in a routine N number of times. Execution may remain in the routine the first N−1 times the breakpoint is encountered. The user may assume that execution remained in the routine between the N−1 and the Nth encounter, when, in fact, the routine returned to its caller and was called again, placing the user in a new instance to the routine. The user, lacking knowledge of the program flow between the N−1th and the Nth encounter with the breakpoint may consume debugging time analyzing a computer program under the incorrect assumption that execution never left the routine.

Embodiments of the present disclosure are directed towards a method, system, and computer program product for helping a user track program flow between breakpoints (e.g., debug stops). According to various embodiments, the execution of a computer program from a first debug stop (e.g., the N−1th encounter with a user breakpoint) to a second debug stop (e.g., the Nth encounter with a user breakpoint) can be monitored to identify routines that execution continued in (e.g., routines that were called or returned to) between the two debug stops. At the second debug stop, entries in a display of the computer program's call stack (e.g., a graphical user interface display containing a list of the computer program's call stack entries) that have been executed since the first debug stop can be highlighted to indicate to the user that program flow continued through the highlighted routines.

Figure 1:
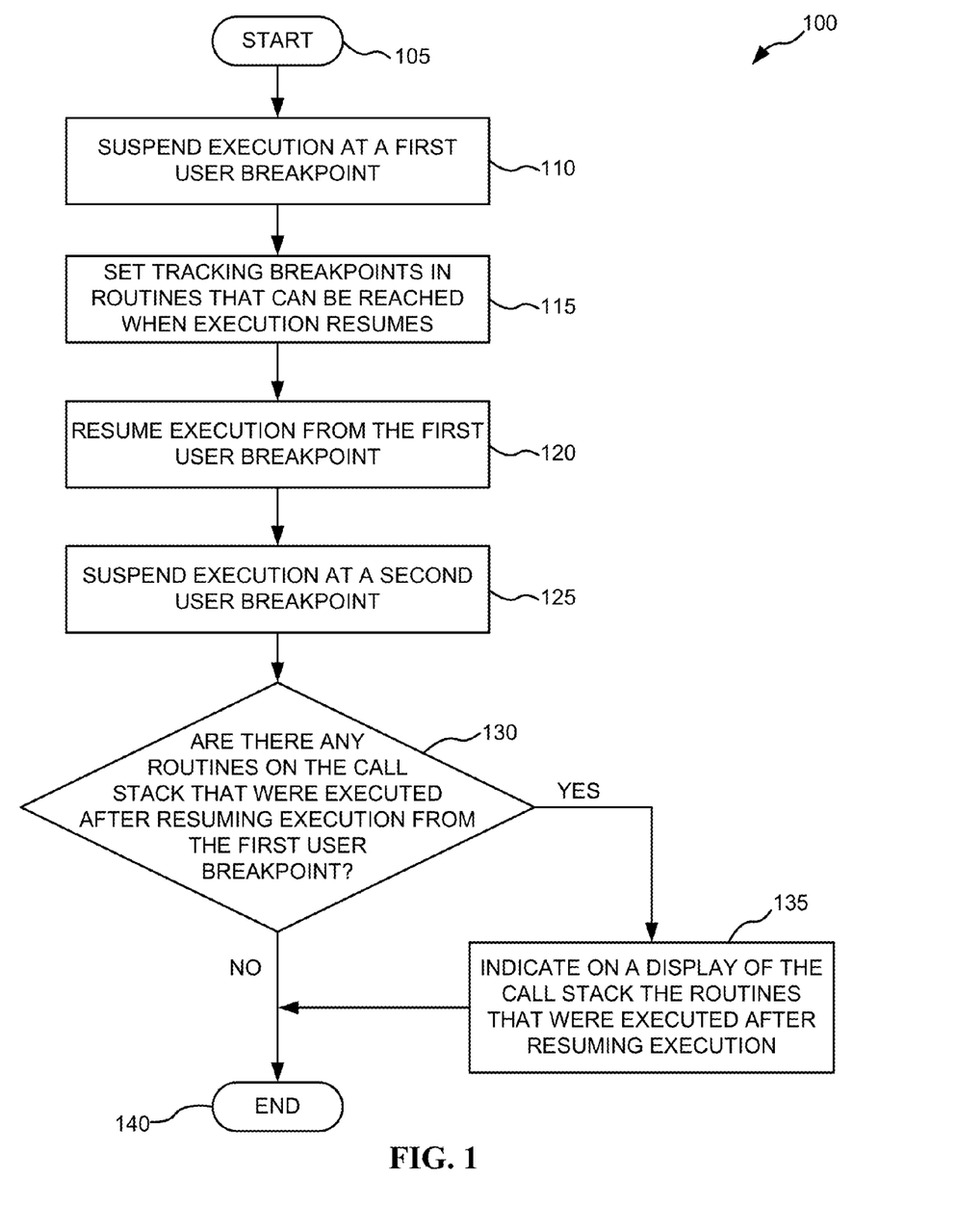
FIG. 1 depicts a flowchart of a computer implemented method for identifying program flow in a computer program executing in a debugger on at least one processor, according to various embodiments.

Referring now to the Figures, FIG. 1 depicts a flowchart of a computer implemented method 100 for identifying program flow in a computer program executing in a debugger on at least one processor, according to various embodiments. The method 100 may be implemented in a software debugger application (hereinafter "debugger") running in the memory of a computing device, such as the computer device shown in FIG. 5. The method 100 may start at operation 105 when the debugger, in response to a user request, loads a computer program under test, which may be referred to herein as a "test program" into the memory of the computing device. As further described below, two types of breakpoints may be inserted into the test program: user breakpoints and tracking breakpoints. In response to a request from a user, the debugger may set one or more user breakpoints in the test program's source or machine executable code (hereinafter "code") and begin executing the application. Inserting a breakpoint into the test program's code may include adding computer executable (or source) debug code into the test program's computer code to suspend execution of the test program and transfer control to the debugger at the breakpoint. In some embodiments, part of the test program's code may be removed, stored, and replaced by the debug code.

The method 100 may be continued at operation 110 where the test program executes until the debugger encounters a first user breakpoint and suspends execution of the test program. Suspending execution of the test program may include executing the computer executable debug code inserted at operation 105 to cause control of the execution to be transferred to the debugger. While the test program's execution is suspended, a user may be able to examine or modify the values of variables, view a display of the call stack, or step through instructions. The display of the call stack may include a listing of routines (e.g., functions or methods), including the name of the module the routines belong to and the stack from address of each listed routine. The routines may be listed in the order that they appear on the stack (e.g., the last routine called may be located at the top most entry listed in the display of the call stack).

The debugger may continue the method 100 by performing operation 115, setting tracking breakpoints in routines that can be reached when execution of the test program resumes. In some embodiments, operation 115 may be performed after the first user breakpoint is encountered, but before resuming execution of the test program. In other embodiments, operation 115 may be performed partially before the first user breakpoint is reached (e.g., after the debugger loads the test program, or after setting a user breakpoint), and partially after the first user breakpoint is reached.

Operation 115 can include setting a tracking breakpoint (described below) at the entry point of each routine (e.g., a breakpoint can be set at the first executable line of code in a routine, or at any other line of code that must be executed before execution leaves the routine) that can be reached (e.g., called or executed) when the debugger resumes execution of the test program from the first user breakpoint. In some embodiments, tracking breakpoints may be set at entry point of every routine in the test program. In certain embodiments, entry point tracking breakpoints can be set before the first user breakpoint is encountered.

Operation 115 may also include setting a tracking breakpoint at the return point of each routine on the test program's call stack. A return point can be a line of code in a first routine of the test program that must be executed when a second routine of the test program that was called by the first routine returns to the first routine. In certain embodiments where multiple threads of the test program may execute in the debugger concurrently, the debugger may examine the call stack of each thread stopped at the user breakpoint, and set tracking breakpoints in each routine having an entry in the call stack of a stopped thread.

According to some embodiments, program flow may continue in a routine without the routine being "called" or "returned to." This non-standard flow can be precipitated by programming constructs such as "setjmp" and "longjmp." According to some embodiments, operation 115 may further include determining at least one computer code instruction in these constructs (e.g., in the library code or routines) from where execution continues before returning to one of the test program's routines and setting a tracking breakpoint at that computer code instruction. In the case of setjmp/longjmp, for example, there is a point in the setjmp library routine that program execution flows through only after longjmp transfers control back to it; a tracking breakpoint can be set at computer code instruction located at this point.

According various embodiments, a "tracking breakpoint" is a breakpoint set automatically by debugger (e.g., a tracking breakpoint is not set in response to a user request to set a breakpoint; a breakpoint set in response to a user request is a "user breakpoint"). When a tracking breakpoint is encountered, execution of the test program may be suspended long enough for the debugger to perform operations in response to encountering the tracking breakpoint (e.g., the suspension may be so brief that the user is not aware of it). Execution of the test program may then resume from the tracking breakpoint without user input.

Tracking breakpoints can be set after encountering a user breakpoint (or any other suspension in the execution of a program that returns control to the debugger), but before the test program is allowed to resume executing. Some tracking breakpoints (e.g., entry point breakpoints, and return point breakpoints for routines that are still on the stack) may be kept in place between breakpoint encounters.

The debugger may continue the method 100 by performing operation 120, resuming execution of the test program from the first user breakpoint. In some embodiments, resuming execution from the first user breakpoint may include resuming execution from the test program's instruction following the instruction that was last executed before the encountering the breakpoint. In particular embodiments, resuming execution from the first user breakpoint may include resuming execution from a test program instruction reached after stepping through one or more computer code instructions after reaching the first user breakpoint.

Performing operation 120 may also include creating and/or updating a data structure used to track program flow (hereinafter "tracking data structure"). A tracking data structure may store data pairs having fields for a routine name and a pointer to a stack frame address associated with the named routine. The debugger may add (e.g., register) a data pair containing the name of the routine having the tracking breakpoint and a pointer to the stack frame associated with the routine to the tracking data structure each time a tracking breakpoint is encountered during execution of the test program. In certain embodiments, the debugger may remove a tracking breakpoint at the return point of a routine once that tracking breakpoint is encountered and a data pair identifying the instance of the routine having the tracking breakpoint is added to the tracking data structure.

Performing operation 120 may further include removing data pairs for routines that are no longer on the call stack from the tracking data structure. Removal may be warranted, for example, when execution in a routine identified by a data pair terminates (e.g., the routine naturally returns control to its calling routine) before program flow encounters a second user breakpoint.

In some embodiments, performing operation 120 may also include establishing an execution threshold. The execution threshold can be an amount of time a debugger tracking program flow in a test program may wait for execution (or control) to return from the test program to the debugger (e.g., the amount of time between breakpoint encounters). When the execution threshold is reached (or exceeded) without execution control returning to the debugger, the debugger may place itself in a "lite" mode where it starts removing every tracking breakpoint it encounters. The debugger may also register, in a second tracking data structure, each routine it encounters while operating in the lite mode. In some embodiments, the second tracking data structure may be the same as the first tracking data structure. In this case, the data pairs may be expanded to include a "tracking" field to indicate that a routine is not being tracked by the debugger.

The debugger may proceed to operation 125 of method 100 after resuming execution from the first user breakpoint. The debugger can perform operation 125 by suspending execution of the test program at a second user breakpoint. In some embodiments, the second user breakpoint may be the same breakpoint as the first user breakpoint.

After suspending execution of the test program, the debugger may determine whether any routines on the call stack were executed after resuming execution from the first user breakpoint, consistent with operation 130. The debugger can determine whether a routine was executed by comparing routine name and stack frame entries on the call stack to each routine name and stack frame pointer data pair in the tracking data structure. A match between a call stack entry and a data pair indicates that the instance of a routine identified by the stack entry was executed (e.g., program flow continued through the routine) between the first and second encounters with the user breakpoints. When an entry on the call stack does not have a matching data pair in the tracking data structure, the debugger may check the second tracking data structure to determine whether the tracking breakpoint for the routine identified in the call stack entry was removed (e.g., removed due to the execution threshold being reached with execution control returning to the debugger). The method 100 may end at operation 140 when a match is not found in either data structure, while the method 100 may continue at operation 135 when a match is found.

The debugger may perform operation 135 by displaying a list of all entries on the call stack. The debugger may then indicate the routines that were executed after resuming execution of the test program at operation 120 by, for example, highlighting the call stack entry for those routines in the display. Entries for routines that are found in the first tracking data structure may be highlighted using a first color and/or pattern (e.g., solid red). Entries for routines that are found in the second data structure may be highlighted a second color and/or pattern (e.g., solid yellow). Entries having the second color may indicate that an instance of the indicated routine was executed after resuming execution of the test program from the first user breakpoint, but the instance of the routine executed may not be the same instance represented by the stack entry. The debugger may then proceed to operation 140.

The debugger may end the method 100 at operation 140 by removing all data pairs from the tracking data structure in preparation for the next time the debugger resumes execution of the test program.

Figure 2:
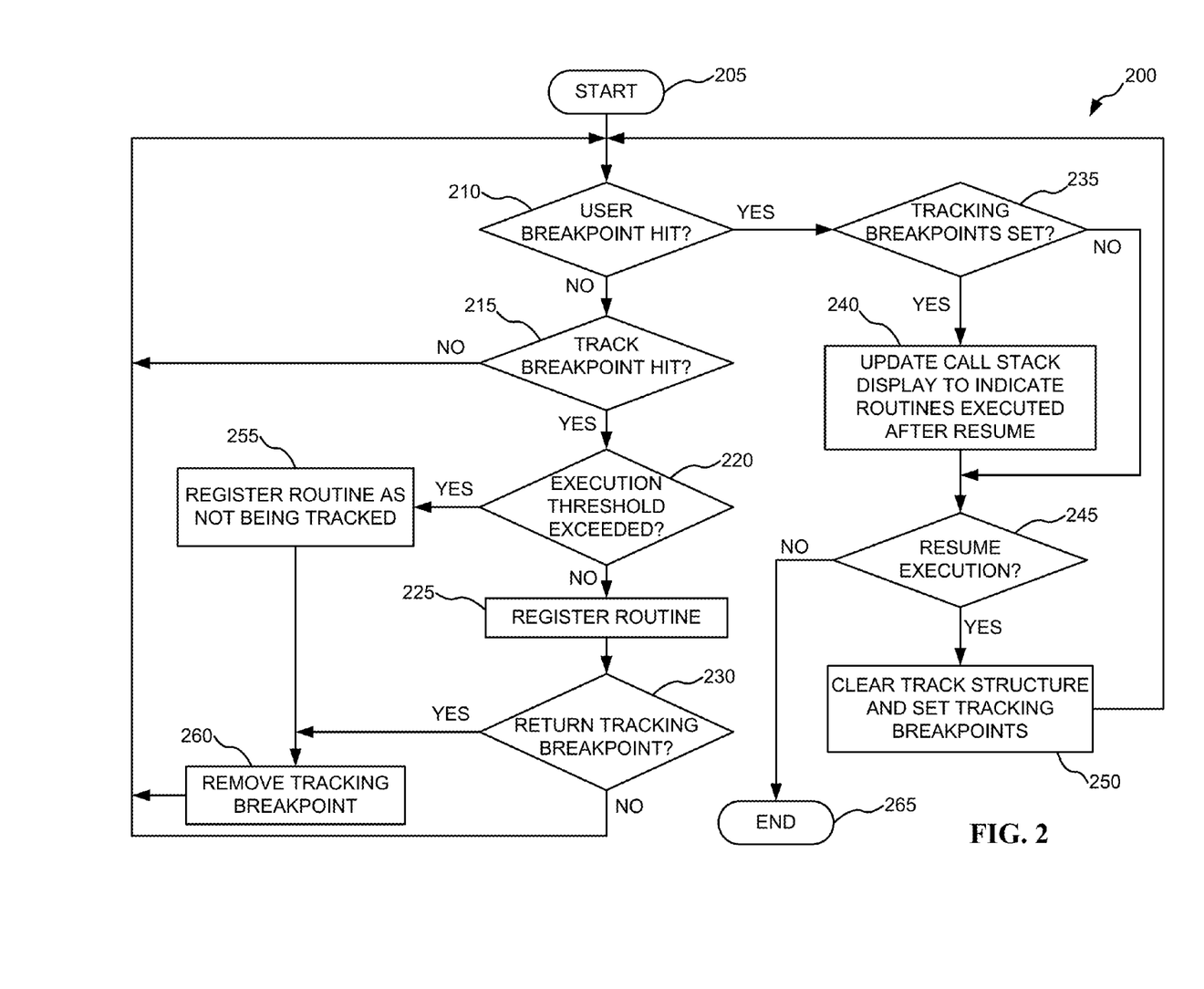
FIG. 2 depicts a flowchart of an example embodiment of a computer implemented method for identifying program flow in a computer program executing in a debugger on at least one processor, according to various embodiments.

FIG. 2 depicts a flowchart of an example embodiment of a computer implemented method 200 for identifying program flow in a computer program executing in a debugger on at least one processor, according to various embodiments. The computer implemented method 200 may be the same as method 100 discussed in association with FIG. 1, and may be executed on a computing device such as computing device 500 shown in FIG. 5.

The method may begin at operation 205 where the debugger loads a test program into a memory of the computing device and sets one or more user breakpoints in the test program. The debugger may then continue the method 200 at operation 210 by determining whether a user breakpoint was encountered (e.g., hit) while executing the test program. When the debugger determines that a user breakpoint was not encountered, the debugger may continue the method 200 at operation 215. The debugger may perform operation 215 by determining whether a tracking breakpoint was encountered. The debugger may return to operation 210 and continue executing the test program when a tracking breakpoint was not encountered, while the debugger may perform operation 220 when a tracking breakpoint is encountered.

At operation 220, the debugger may determine whether the test program has been executing for too long without returning control to the debugger (e.g., the debugger may determine whether an execution threshold was exceeded). When the debugger determines that the test program has been executing for too long without returning control to the debugger, the debugger may execute operation 255. Alternatively, the debugger may execute operation 225 when it determines that the test program has not been executing for too long without returning control to the debugger.

The debugger may perform operation 255 by registering the routine having the tracking breakpoint encountered in operation 215 as not being tracked. The debugger may then proceed to operation 260 where the tracking breakpoint can be removed from the test program.

When the debugger determines in operation 220 that the test program has not been executing for too long, the debugger may execute operation 225 by registering the routine having the tracking breakpoint encountered in operation 215 in a tracking data structure (e.g., a first tracking data structure), as described herein.

The debugger may then continue the method 200 by performing operation 230, determining whether the tracking breakpoint encountered was located at the return point of a routine. The debugger may return to operation 210 when the tracking breakpoint is not at the return point of a routine, while the debugger may perform operation 260 and remove the tracking breakpoint when the tracking breakpoint is at the return point of the routine. After performing operation 260, the debugger may return to operation 210 and continue execution of the test program.

When the debugger determines, at operation 210, that a user breakpoint was encountered, the debugger may continue the method 200 by performing operation 235, determining whether any tracking breakpoints are set in the test program (e.g., determining whether the debugger is currently tracking program). Determining whether tracking breakpoints are set can include examining, for example, a breakpoint table associated with the debugger. When the debugger determines that there are tracking breakpoints in the test program, the debugger may perform operation 240 and display the test program's call stack, including highlighting routines that were executed after resuming the test program following a suspension by the debugger. Operation 240 can be the equivalent of the combined operation 130 and operation 135 from the method 100 in FIG. 1.

The debugger may determine whether to resume execution of the test program at operation 245 after displaying the call stack or after determining that no tracking breakpoints were set in the test program. The debugger may determine to resume executing the test program in response to a user request to resume execution. When the debugger determines to resume execution, the debugger may delete all the data pairs from the tracking data structure(s), create a new set of tracking breakpoints, and proceed to operation 210, consistent with operation 250. The debugger may end the method 200 at operation 265 when it decides to not resume execution of the test program.

Figure 3:
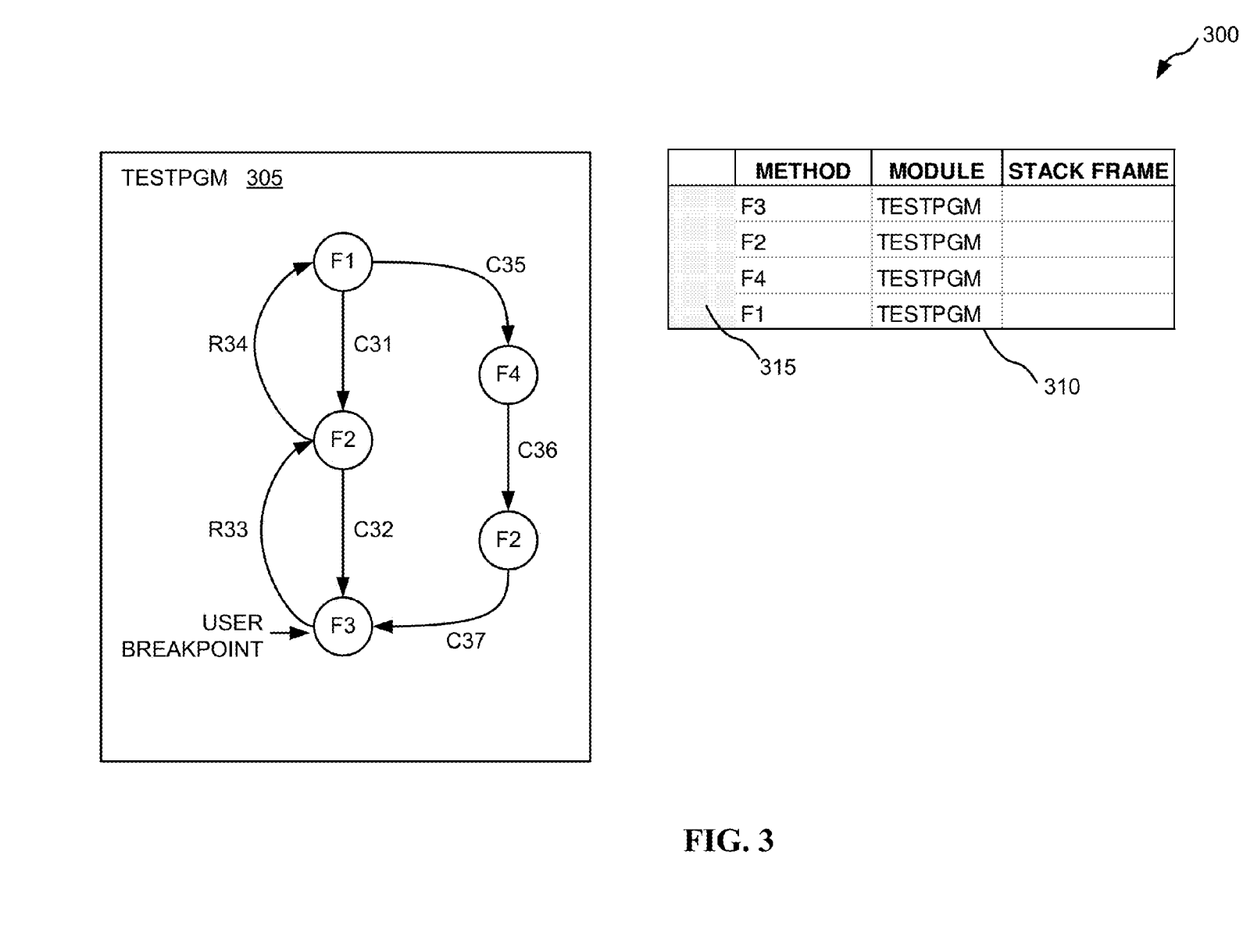
FIG. 3 depicts a block diagram of an exemplary scenario of a debugger executing a test program using the computer implemented methods described herein, according to various embodiments.

FIG. 3 depicts a block diagram of an exemplary scenario of a debugger 300 executing a test program 305 using the computer implemented methods described herein, according to various embodiments. The debugger 300 may be a software debugger application running in the memory of a computing device, such as the computer device 500 shown in FIG. 5. In some embodiments the debugger 300 may include a test program 305 (e.g., TESTPGM), and a display of the test program's call stack 310.

Referring still to FIG. 3, the debugger 300 includes a graph 305 that is useful to help illustrate the interactions between routines of the test program while the test program is executing. The nodes of the graph represent routines while the edges represent the transition of program flow between routines (e.g., calls to routines, and returns from calls to routines).

Still referring to FIG. 3, the graph 305 shows that the test program first executes a call to routine F1. Routine F1 then calls routine F2, as illustrated by edge C31. Next, F2 calls routine F3, as shown by edge C32. Execution continues through F3 until encounter a user breakpoint at a line of code in F3, when the debugger 300 suspends execution. Before resuming execution of the test program 305 at the request of the user, the debugger 300 adds tracking breakpoints (not shown) to each routine (e.g., routine F1, F2, F3, and F4) of the test program, as described herein. Execution then resumes in F3 until program flow returns from F3 to F2, as indicated by edge R33. The graph 305 shows that the test program then continues execution from the return point in F2 until it encounters a tracking breakpoint. The debugger 300 temporarily suspends execution of the test program at the tracking breakpoint in F2, and registers F2 in a tracking data structure (e.g., the debugger adds F2 and the stack frame address of the current instance of F2 to the tracking data structure). At this point, the debugger can remove the tracking breakpoint at the return point of F2.

The debugger 300 resumes execution of the test program (without the user's input, according to various embodiments), which continues execution in F2 before returning to F1, as shown by edge R34. When the test program returns to F1, it encounters a second tracking breakpoint at the return point in F1. At this second tracking breakpoint, the debugger can again suspend execution of the test program long enough to register F1 in the tracking data structure and to remove the tracking breakpoint from the return point in F1. The debugger 300 may also remove the instance of F2 that was previously added to the tracking data structure because that instance is no longer valid (e.g., the routine name and stack frame pair for the instance of F2 recorded earlier no longer exists on the call stack). The debugger 300 may then resume the test program from the second tracking breakpoint.

After execution resumes in the test program from the second tracking breakpoint, F1 may call routine F4, as illustrated by edge C35. Program flow may then continue in F4 until encountering a third tracking breakpoint (e.g., a tracking breakpoint at the entry point of F4). The debugger 300 may suspend execution of the test program long enough to register F4 in the tracking data structure. In some embodiments, the debugger 300 may leave the third tracking breakpoint in place. The debugger may then resume executing the test program from the third tracking breakpoint.

After resuming in the test program from the third tracking breakpoint, F4 may call routine F2, as illustrated by edge C36. Program flow may then continue in F2 until encountering a fourth tracking breakpoint. The debugger 300 may suspend execution of the test program long enough to register F2 in the tracking data structure. The debugger 300 may then resume executing the test program from the third tracking breakpoint.

After execution resumes in the test program 305, F2 may call routine F3, as illustrated by edge C37. Program flow may then continue in F3 until encountering a tracking breakpoint at, for example, the entry point of F3. The debugger 300 may suspend execution of the test program long enough to register F3 in the tracking data structure. Execution may then continue in F3 until the user breakpoint in F3 is encountered a second time. At this point, the debugger 300 may suspend execution of the test program and update the call stack display 310 to highlight the routines that program flow continued in since encountering the user breakpoint the first time. The debugger 300 may determine which routines to highlight by comparing a routine name and stack frame address of each entry in the call stack against each data pair in the tracking data structure. Each call stack entry having a matching data pair in the tracking data structure can be highlighted in the call stack display. In the present example, routines F1, F4, F2 and F3 are highlighted (e.g., at indicated by the patterned region 315) to show that program flow through these after encountering the first user breakpoint.

Figure 4:
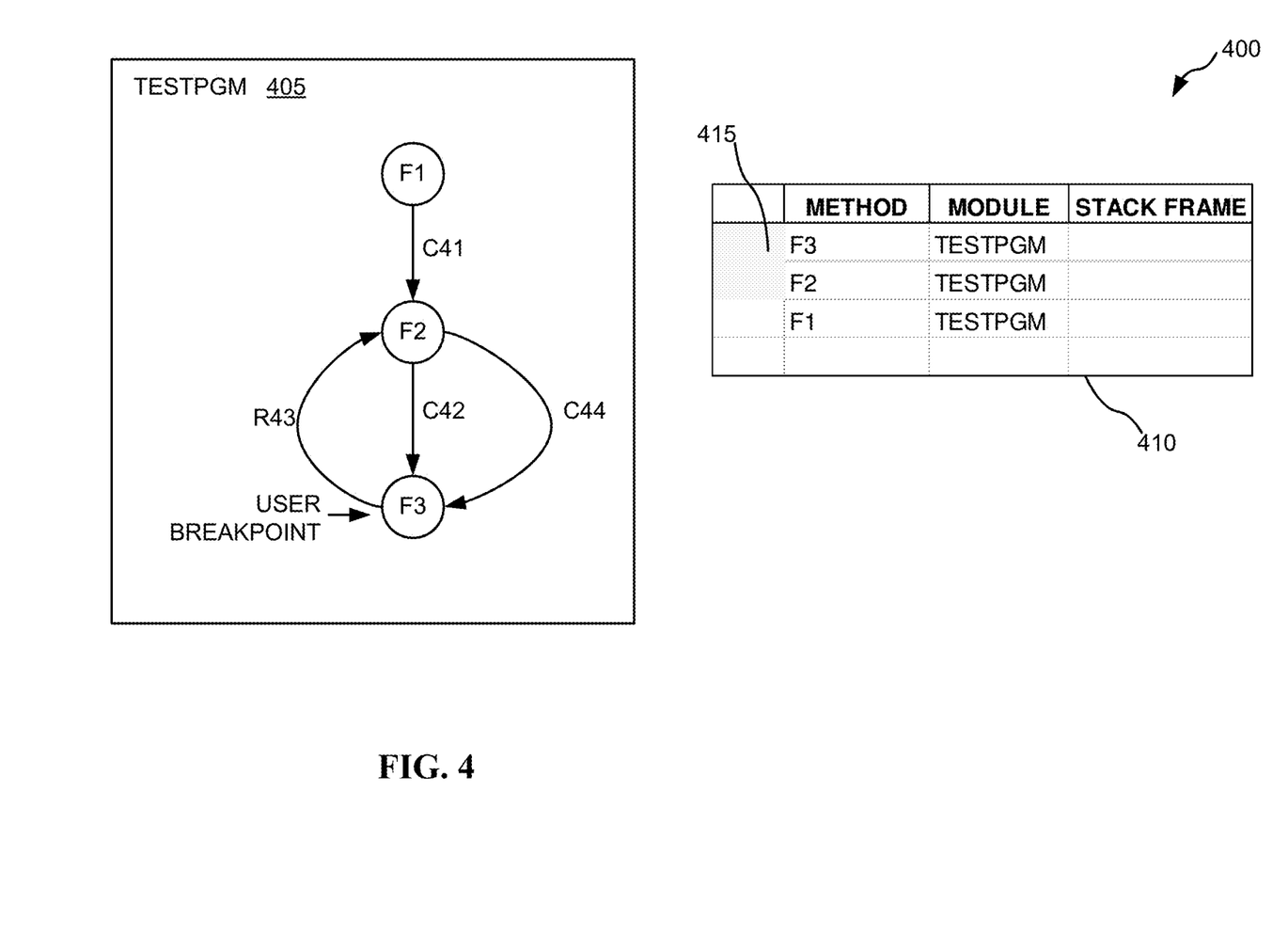
FIG. 4 depicts a block diagram of a second exemplary scenario of a debugger executing a test program using the computer implemented methods described herein, according to various embodiments.

FIG. 4 depicts a block diagram of a second exemplary scenario of a debugger 400 executing a test program, illustrated by a graph 405, using the computer implemented methods described herein, according to various embodiments.

Still referring to in FIG. 4, the graph 405 shows that the test program begins executing with a call to routine F1. Routine F1 then calls routine F2, as illustrated by connecting C41. Next, F2 calls routine F3, as shown by edge C42. Execution continues through F3 until reaching a user breakpoint at a line of code in F3, when the debugger 400 suspends execution of the test program. Before resuming execution at the request of the user, the debugger automatically adds tracking breakpoints (not shown) in each routine (e.g., routine F1, F2, and F3) of the test program, as described herein. Execution then resumes in F3 until program flow returns from F3 to F2, as indicated by edge R43.

The debugger 400 may continue executing the test program 405 from the return point in F2 until execution encounters a tracking breakpoint at the return point in F2. The debugger 400 may then temporarily suspend execution of the test program 405 long enough to register F2 in a tracking data structure. The debugger 400 may also remove the tracking breakpoint at the return point of F2.

The debugger 400 may then continue executing the test program, where execution may continue in F2 until program flow is transferred to routine F3, as shown by edge C44, indicating a call from F2 to F3.

Program flow may continue in F3 until encountering a tracking breakpoint at, for example, the entry point of F3. The debugger 400 may suspend execution of the test program long enough to register F3 in the tracking data structure. Execution may then continue in F3 until the user breakpoint in F3 is encountered a second time. At this point, the debugger may suspend execution of the test program and update the call stack display 410 to highlight the routines that program flow continued in since encountering the user breakpoint the first time. The debugger 400 may determine which routines to highlight by comparing a routine name and stack frame address of each entry in the call stack against each data pair in the tracking data structure. Each entry matching a data pair in the tracking data structure can be highlighted in the call stack display. In the present example, routines F2 and F3 are highlighted (e.g., at indicated by the patterned region 415) to show control flowed through these routines after encountering the user breakpoint the first time.

Figure 5:
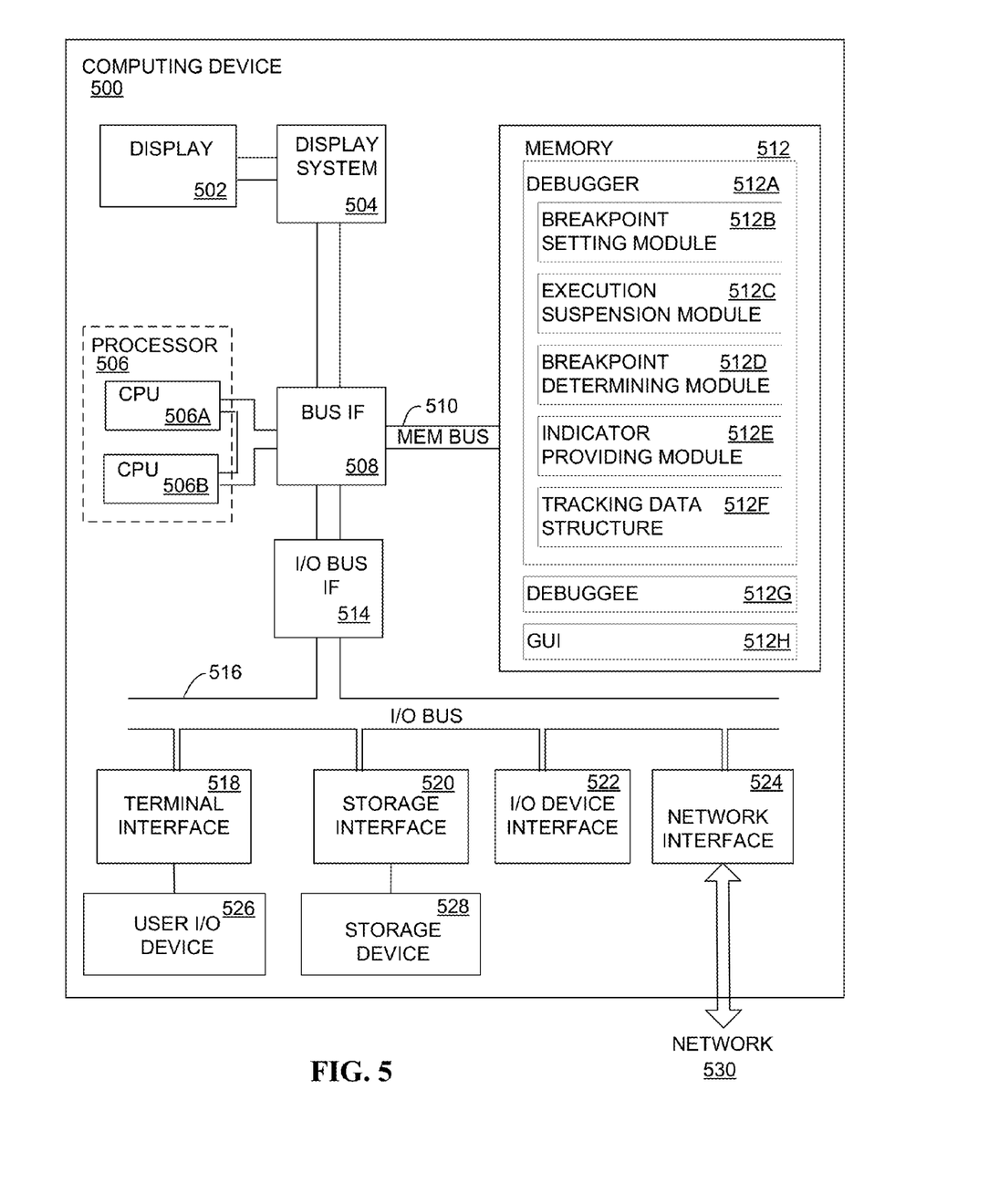
FIG. 5 depicts a block diagram illustrating an exemplary embodiment of a computing device that includes a memory, according to various embodiments.

FIG. 5 depicts a block diagram illustrating an exemplary embodiment of a computing device that includes a memory. The components of the computing device 500 can include one or more processors 506, a memory 512, a terminal interface 518, a storage interface 520, an Input/Output ("I/O") device interface 522, and a network interface 524, all of which are communicatively coupled, directly or indirectly, for inter-component communication via a memory bus 510, an I/O bus 516, a bus interface unit ("IF") 508, and an I/O bus interface unit 514.

The computing device 500 may include one or more general-purpose programmable central processing units ("CPUs") 506A and 506B, herein generically referred to as the processor 506. In an embodiment, the computing device 500 may contain multiple processors; however, in another embodiment, the computing device 500 may alternatively be a single CPU device. Each processor 506 executes instructions stored in the memory 512.

The computing device 500 may include a bus interface unit 508 to handle communications among the processor 506, the memory 512, the display system 504, and the I/O bus interface unit 514. The I/O bus interface unit 514 may be coupled with the I/O bus 516 for transferring data to and from the various I/O units. The I/O bus interface unit 514 may communicate with multiple I/O interface units 518, 520, 522, and 524, which are also known as I/O processors (IoPs) or I/O adapters (IoAs), through the I/O bus 516. The display system 504 may include a display controller, a display memory, or both. The display controller may provide video, audio, or both types of data to a display device 502. The display memory may be a dedicated memory for buffering video data. The display system 504 may be coupled with a display device 502, such as a standalone display screen, computer monitor, television, a tablet or handheld device display, or another other displayable device. According to some embodiments, when a user breakpoint is encountered while debugging a test program as described herein, the display system 504 may render a graphical user interface (GUI) having a display of the call stack, including highlighted entries, of a test program being debugged. In an embodiment, the display device 502 may include one or more speakers for rendering audio. Alternatively, one or more speakers for rendering audio may be coupled with an I/O interface unit. In alternate embodiments, one or more functions provided by the display system 504 may be on board an integrated circuit that also includes the processor 506. In addition, one or more of the functions provided by the bus interface unit 508 may be on board an integrated circuit that also includes the processor 506.

The I/O interface units support communication with a variety of storage and I/O devices. For example, the terminal interface unit 518 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 526 and the computing device 500, may receive output data via the user output devices. For example, a user interface may be presented via the user I/O device 526, such as displayed on a display device, played via a speaker, or printed via a printer.

The storage interface 520 supports the attachment of one or more disk drives or direct access storage devices 528 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 528 may be implemented via any type of secondary storage device. The contents of the memory 512, or any portion thereof, may be stored to and retrieved from the storage device 528 as needed. The I/O device interface 522 provides an interface to any of various other I/O devices or devices of other types, such as printers or fax machines. The network interface 524 provides one or more communication paths from the computing device 500 to other digital devices and computer systems.

Although the computing device 500 shown in FIG. 5 illustrates a particular bus structure providing a direct communication path among the processors 506, the memory 512, the bus interface 508, the display system 504, and the I/O bus interface unit 514, in alternative embodiments the computing device 500 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 514 and the I/O bus 508 are shown as single respective units, the computing device 500, may include multiple I/O bus interface units 514 and/or multiple I/O buses 516. While multiple I/O interface units are shown, which separate the I/O bus 516 from various communication paths running to the various I/O devices, in other embodiments, some or all of the I/O devices are connected directly to one or more system I/O buses.

In various embodiments, the computing device 500 is a multi-user mainframe computer system, a single-user system, or a server computer or similar device that has little or no direct user interface, but receives requests from other computer systems (clients). In other embodiments, the computing device 500 may be implemented as a desktop computer, portable computer, laptop or notebook computer, tablet computer, pocket computer, telephone, smart phone, or any other suitable type of electronic device.

In an embodiment, the memory 512 may include a random-access semiconductor memory, storage device, or storage medium (either volatile or non-volatile) for storing or encoding data and programs. In another embodiment, the memory 512 represents the entire virtual memory of the computing device 500, and may also include the virtual memory of other computer systems coupled to the computing device 500 or connected via a network 530. The memory 512 may be a single monolithic entity, but in other embodiments the memory 512 may include a hierarchy of caches and other memory devices. For example, memory may exist in multiple levels of caches, and these caches may be further divided by function, so that one cache holds instructions while another holds non-instruction data, which is used by the processor. Memory 512 may be further distributed and associated with different CPUs or sets of CPUs, as is known in any various so-called non-uniform memory access (NUMA) computer architectures.

The memory 512 may store all or a portion of the software debugger application (or module) used to implement the methods described in FIGS. 1-4. The memory 512 may also include debugee (e.g., a test program, as described herein) 512G, and a GUI 512H for displaying the contents of the debugee's call stack at a user breakpoint.

The debugger 512A, debugee 512G, and GUI 512H may include computer programs and data structures (e.g., a tracking data structure 512F) that are configured to implement the methods described in FIGS. 1-4. For example, the debugger 512A (e.g., a debugger module) may include a breakpoint setting module 512B configured to automatically insert tracking breakpoints in the test program, an execution suspension module 512C configured to suspend execution of the test program at breakpoint, a breakpoint determining module 512D configured to determine when a breakpoint is encountered, and an indicator providing module 512E configured to provide an indicator (via a GUI) of routines executed between breakpoint encounters. These programs and data structures may be included within the memory 512 in the computing device 500, and may be automatically configured or operated by a script executing on a processor of the computing device 500. In certain embodiments, some or all of them may be on different computer systems and may be accessed remotely, e.g., via a network 530. The debugger 512A, for example, may be on a first computing devices similar to the computing device 500, while the GUI 512H providing an interface to the debugger may be on a second computing device. The computing device 500 may use virtual addressing mechanisms that allow the programs of the computing device 500 to behave as if they only have access to a large, single storage entity instead of access to multiple, smaller storage entities. Thus, while the components and data associated with FIGS. 1-4 are illustrated as being included within the memory 512, these components and data are not necessarily all completely contained in the same storage device at the same time. Although the components and data associated with FIGS. 1-4 are illustrated as being separate entities, in other embodiments some of them, portions of some of them, or all of them may be packaged together.

In an embodiment, the components and data associated with FIGS. 1-4 may include instructions or statements that execute on the processor 506 or instructions or statements that are interpreted by instructions or statements that execute the processor 506 to carry out the functions as further described herein. In another embodiment, the components associated with FIGS. 1-4 may be implemented in hardware via semiconductor devices, chips, logical gates, circuits, circuit cards, and/or other physical hardware devices in lieu of, or in addition to, a processor-based system. In an embodiment, the components associated with FIGS. 1-4 may include data in addition to instructions or statements.

FIG. 5 is intended to depict representative components of the computing device 500. Individual components, however, may have greater complexity than represented in FIG. 5. In FIG. 5, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 5 may be implemented, in various embodiments, in a number of different ways, including using various computer applications, routines, components, programs, objects, modules, data structures etc., which may be referred to herein as "software," "computer programs," or simply "programs."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system for identifying program flow in a computer program, executing in a debugger on at least one processor, subsequent to suspending execution of the computer program at a user breakpoint, comprising:
    a memory configured to store the computer program;
    a first execution suspension module configured to suspend execution of the computer program at a first user breakpoint, wherein user breakpoints are set in response to requests from a user, user breakpoints suspend execution of the computer program until execution is resumed by the user;
    a breakpoint setting module configured to automatically set one or more tracking breakpoints in one or more routines that can continue execution from the first user breakpoint, wherein tracking breakpoints are set automatically by the breakpoint setting module without user input, tracking breakpoints enable the computer system to automatically suspend and resume execution of computer programs without user input;
    a debugger module configured to execute the computer program to:
        execute one or more instructions of the computer program,
        determine that a tracking breakpoint was reached and temporarily suspend execution of the computer program in response to the determination, register, automatically in response to the suspension, in a tracking data structure that execution reached at least one of the one or more routines having the tracking breakpoint, and resume, automatically without user input, execution of the computer program;

a second execution suspension module configured to suspend execution of the computer program at a second user breakpoint after processing by the at least one processor at least one instruction of the computer program;

a breakpoint determining module configured to determine whether to provide an indicator to indicate that at least one of the one or more tracking breakpoints was hit while executing the computer program; and an indicator providing module configured to provide the indicator in response to determining to provide the indicator.

2. The computer system of claim 1, wherein the breakpoint setting module is further configured to automatically set a tracking breakpoint in at least one of the entry point of each routine in the computer program, and the return point of each routine on a call stack associated with the computer program.

3. The computer system of claim 1, wherein the breakpoint setting module is further configured to automatically set a tracking breakpoint in a routine at an instruction of the computer program that must be executed before execution leaves the routine.

4. The computer system of claim 3, wherein the routine is at least one of a setjmp construct and a longjmp construct.

5. The computer system of claim 1, wherein the debugger module is further configured to:

determine that a tracking breakpoint was reached;

determine that an execution threshold was exceeded before the tracking breakpoint was reached;

remove, automatically without user input, in response to determining that the execution threshold was exceeded before the tracking breakpoint was reached, the tracking breakpoint; and register in a tracking data structure that execution reached a routine having the tracking breakpoint.

6. The computer system of claim 1, wherein the breakpoint setting module is further configured to:

determine whether execution can continue in a second routine without reaching an entry point of the second routine;

determine a first instruction that must be processed by the at least one processor when execution continues in the second routine; and set a tracking breakpoint at the first instruction.

7. A computer program product for identifying program flow in a computer program, executing in a debugger on at least one processor, subsequent to suspending execution of the computer program at a user breakpoint, the computer program product including a computer readable storage medium having program instructions embodied therewith, wherein the computer readable storage medium is not a transitory signal per se, the program instructions executable by a processing circuit to cause the processing circuit to perform a method comprising:

suspending execution of the computer program at a first user breakpoint, wherein user breakpoints are set in response to requests from a user, user breakpoints suspend execution of the computer program until execution is resumed by the user;

setting, automatically by the debugger, one or more tracking breakpoints in one or more routines that can continue execution from the first user breakpoint, wherein tracking breakpoints are set automatically without user input, tracking breakpoints enable the computer program product to automatically suspend and resume execution of computer programs without user input;

executing the computer program by:

executing one or more instructions of the computer program, determining that a tracking breakpoint was reached and temporarily suspend execution of the computer program in response to the determination, registering, automatically in response to the suspension, in a tracking data structure that execution reached at least one of the one or more routines having the tracking breakpoint, and resuming, automatically without user input, execution of the computer program;

suspending, subsequent to the executing, execution of the computer program at a second user breakpoint after processing by the at least one processor at least one instruction of the computer program;

determining whether to provide an indicator to indicate that at least one of the one or more tracking breakpoints was hit during the executing; and providing the indicator in response to determining to provide the indicator.

8. The computer program product of claim 7, wherein the setting further comprises:

setting a tracking breakpoint at the entry point of each routine in the computer program.

9. The computer program product of claim 7, wherein the setting further comprises:

setting a tracking breakpoint at the return point of each routine on the call stack.

10. The computer program product of claim 7, wherein the executing further comprises:

determining that a tracking breakpoint was reached; and registering in a tracking data structure that execution reached one of the one or more routines having the tracking breakpoint.

11. The computer program product of claim 7, wherein providing an indicator further comprises:

determining that a tracking breakpoint was reached;

determining an execution threshold was exceeded before the tracking breakpoint was reached;

removing, in response to determining that the execution threshold was exceeded before the tracking breakpoint was reached, the tracking breakpoint; and registering in a tracking data structure that execution reached a routine having the tracking breakpoint.

12. The computer program product of claim 7, wherein the setting further comprises:

determining whether execution can continue in a second routine without reaching an entry point of the second routine;

determining a first instruction that must be processed by the at least one processor when execution continues in the second routine; and setting a tracking breakpoint at the first instruction.

13. The computer program product of claim 7, wherein providing an indicator further comprises:

highlighting, in a graphical display of the call stack, a call stack entry for the routine.

* * * * *